(12) United States Patent  
Sauer

(10) Patent No.: US 11,592,068 B2
(45) Date of Patent: Feb. 28, 2023

(54) CLUTCH ASSEMBLY BRAKE

(71) Applicant: Rolls-Royce Corporation, Indianapolis, IN (US)

(72) Inventor: Kevin Sauer, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/335,259

(22) Filed: Jun. 1, 2021

(65) Prior Publication Data

US 2022/0018415 A1 Jan. 20, 2022

Related U.S. Application Data

(60) Provisional application No. 63/037,315, filed on Jun. 10, 2020.

(51) Int. Cl.
| *F16D 67/02* | (2006.01) |
| *F16D 13/26* | (2006.01) |
| *B64D 35/00* | (2006.01) |
| *F16D 47/04* | (2006.01) |
| *F16D 48/00* | (2006.01) |

(Continued)

(52) U.S. Cl.
CPC ............ *F16D 67/02* (2013.01); *B64D 35/00* (2013.01); *F16D 13/26* (2013.01); *F16D 23/04* (2013.01); *F16D 25/082* (2013.01); *F16D 41/06* (2013.01); *F16D 47/04* (2013.01); *F16D 48/00* (2013.01); *F16D 67/04* (2013.01); *F16D 2011/004* (2013.01); *F16D 2065/024* (2013.01)

(58) Field of Classification Search
CPC . B64C 27/12; B64C 2027/8236; B64D 35/00; B64D 35/08; F16D 67/02; F16D 67/04; F16D 2011/002; F16D 2011/04; F16D 11/14; F16D 13/26; F16D 23/04; F16D 41/06; F16D 41/069; F16D 41/07; F16D 47/04; F16D 48/00; F16D 2065/024; F16D 2121/04; F16D 2121/06
USPC .............................. 192/16, 18 R, 18 A, 18 B
See application file for complete search history.

(56) References Cited

U.S. PATENT DOCUMENTS 4,403,526 A * 9/1983 Numazawa ........... F16H 37/046
 475/207
4,534,454 A * 8/1985 Brooks ................... F16D 67/04
 192/18 A (Continued)

FOREIGN PATENT DOCUMENTS

EP 2246255 B1 12/2018

*Primary Examiner* — Richard M Lorence
(74) *Attorney, Agent, or Firm* — Shumaker & Sieffert, P.A.

(57) ABSTRACT

The disclosure describes a clutch assembly that includes a first clutch element coupled to an input shaft and including a first clutch element friction surface; a second clutch element coupled to an output shaft, and a brake clutch coupled to a stationary component. The second clutch element includes a first friction surface configured to engage the first clutch element friction surface and a second friction surface opposite the first friction surface. The second clutch element is configured to move relative to the first clutch element to engage and disengage the first friction surface and the first clutch element friction surface. The brake clutch includes a brake clutch friction surface configured to engage the second friction surface of the second clutch element when the first clutch element and the second clutch element are disengaged.

19 Claims, 4 Drawing Sheets

(51) Int. Cl.
*F16D 41/06* (2006.01)
*F16D 67/04* (2006.01)
*F16D 23/04* (2006.01)
*F16D 25/08* (2006.01)
*F16D 11/00* (2006.01)
*F16D 65/02* (2006.01)

(56) References Cited

U.S. PATENT DOCUMENTS

| | | | | |
|---|---|---|---|---|
| 4,706,520 A | * | 11/1987 | Sivalingam | F16H 3/54 475/140 |
| 2008/0169379 A1 | * | 7/2008 | Cotton | B64C 27/14 244/60 |
| 2017/0291699 A1 | * | 10/2017 | Hunter | B64C 27/473 |
| 2020/0070996 A1 | * | 3/2020 | Hefner | B64C 27/82 |

\* cited by examiner

CLUTCH ASSEMBLY BRAKE

This application claims the benefit of U.S. Provisional Application Ser. No. 63/037,315, entitled "CLUTCH ASSEMBLY BRAKE" filed on Jun. 10, 2020, the entire content of which is incorporated herein by reference.

TECHNICAL FIELD

The present disclosure relates to clutch assemblies.

BACKGROUND

Gas turbine engines used to propel vehicles, e.g., aircraft, may include one or more output shafts driven by an engine core. The output shaft(s) may drive one or more propulsors, such as propellers, rotors, or the like. In some examples, the output shaft(s) may be coupled to the one or more propulsors via a gearbox and/or a clutch assembly.

SUMMARY

In some examples, the disclosure describes a clutch assembly that includes a first clutch element coupled to an input shaft and including a first clutch element friction surface; a second clutch element coupled to an output shaft, and a brake clutch coupled to a stationary component. The second clutch element includes a first friction surface configured to engage the first clutch element friction surface and a second friction surface opposite the first friction surface. The second clutch element is configured to move relative to the first clutch element to engage and disengage the first friction surface and the first clutch element friction surface. The brake clutch includes a brake clutch friction surface configured to engage the second friction surface of the second clutch element when the first clutch element and the second clutch element are disengaged.

In some examples, the disclosure describes a system that includes a gearbox; a propeller coupled to a propeller shaft; and a clutch assembly. The clutch assembly includes a first clutch element coupled to an input shaft and including a first clutch element friction surface. The input shaft is coupled to the gearbox. The clutch assembly also includes a second clutch element coupled to the propeller shaft. The second clutch element includes a first friction surface configured to engage the first clutch element friction surface and a second friction surface opposite the first friction surface. The second clutch element is configured to move relative to the first clutch element to engage and disengage the first friction surface and the first clutch element friction surface. The clutch assembly further includes a brake clutch coupled to a stationary component. The brake clutch includes a brake clutch friction surface configured to engage the second friction surface of the second clutch element when the first clutch element and the second clutch element are disengaged. Engagement of the second clutch element and the brake clutch stops rotation of the propeller.

The details of one or more examples are set forth in the accompanying drawings and the description below. Other features, objects, and advantages will be apparent from the description and drawings, and from the claims.

DETAILED DESCRIPTION

The disclosure describes clutch assemblies that include brakes for a turboprop propulsion system. For example, a pusher prop helicopter may include at least one gas turbine engine, at least one gearbox, and a clutch assembly described herein. The clutch assembly may enable engagement and disengagement of the pusher prop from the at least one gearbox, such that the pusher prop may be powered by the gas turbine engine(s) or left un-powered. The clutch assemblies described herein include a brake configured to engage the clutch element coupled to the pusher prop shaft to stop rotation of the pusher prop when the clutch element coupled to the pusher prop shaft is disengaged from the clutch element coupled to the gearbox shaft.

Without the clutch assembly brake described herein, the pusher prop may be free to windmill (e.g., move under influence of air flowing past the pusher prop) when the pusher prop clutch element is disengaged from the gearbox shaft clutch element. Windmilling of the pusher prop reduces predictability of pusher prop speed when the pusher prop is unpowered by the gas turbine engine(s). For example, the pusher prop may rotate at anywhere between 0% and more than 100% of its rated speed while windmilling, and the rotational speed may change unpredictably. This creates uncertainty around bearing loading, may result in unneeded lubrication of bearings of the pusher prop shaft (e.g., at times at which the pusher prop shaft is not rotating), and/or may cause safety issues if the pusher prop windmills while the pusher prop helicopter is on the ground. Further, this may introduce uncertainty in rotational speed of the pusher prop clutch element just before engaging the pusher prop clutch element with the gearbox clutch element. This may produce unpredictable loads on the clutch elements, potentially introducing premature wear and/or failure of the clutch assembly.

The clutch assemblies described herein include a brake that includes a stationary clutch cone or disc which a back side of the pusher prop clutch element engages when disengaged from the gearbox clutch element. In this way, the brake may be implemented with relatively small additional volume within the clutch assembly, while reducing or substantially eliminating windmilling of the pusher prop. This may increase certainty around loading of bearings of the pusher prop shaft, reduce or eliminate lubrication of the bearings of the pusher prop shaft while the brake is engaged, reduce or eliminate safety issues caused by the pusher prop windmilling while the pusher prop helicopter is on the ground, and/or increase certainty in rotational speed of the pusher prop clutch element when engaging the pusher prop clutch element with the gearbox clutch element.

Figure 1:
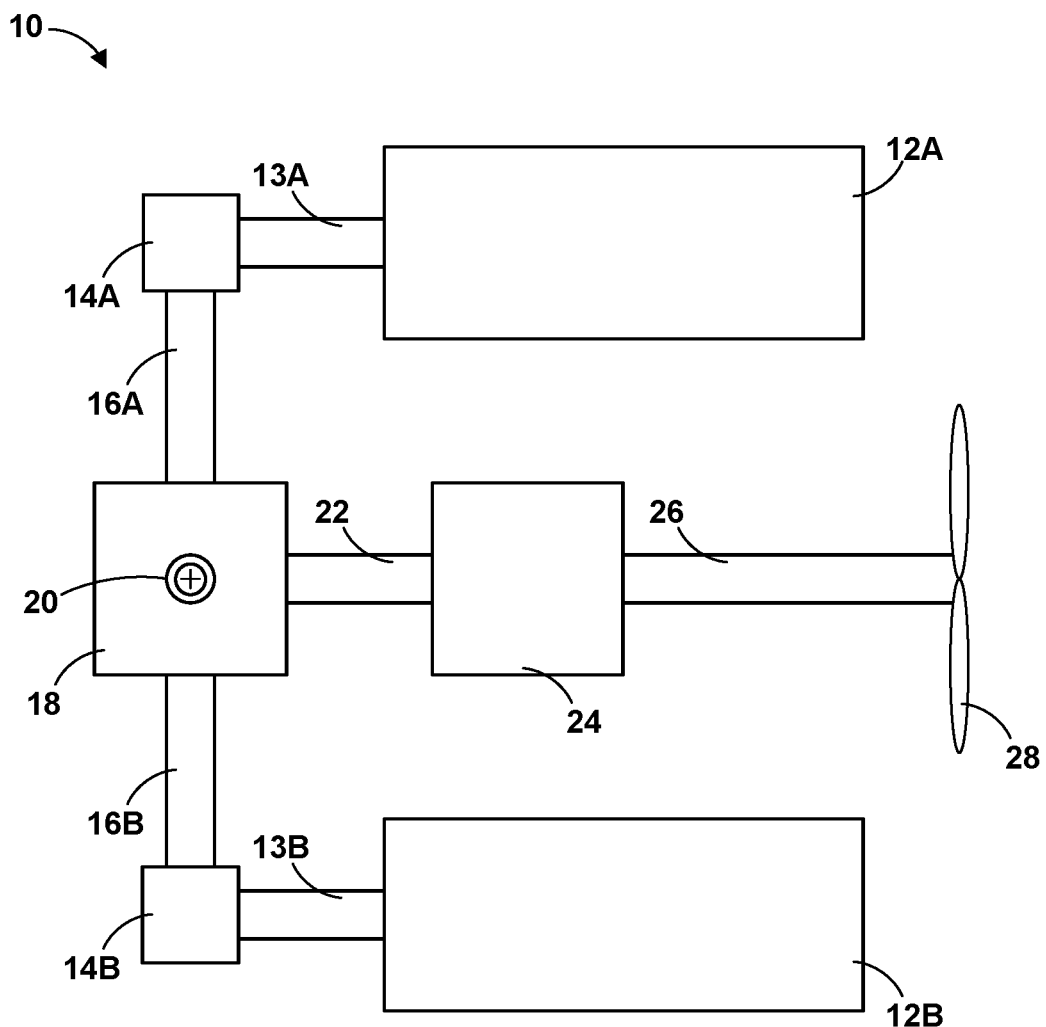
FIG. 1 is a block diagram illustrating an example propulsion system for a helicopter or other rotary wing aircraft.

FIG. 1 is a schematic diagram illustrating an example propulsion system 10 for a helicopter or other rotary wing aircraft. Propulsion system 10 includes a pair of horizontally spaced gas turbine engines 12A and 12B (collectively, "gas turbine engines 12"), each having an output shaft 13A and 13B (collectively, "output shafts 13") coupled to a corresponding speed-reducing, right angle nose gearbox 14A and 14B (collectively, "nose gearboxes 14"). Each gas turbine engine includes at least one compressor stage, a combustor, and at least one turbine stage that extracts work from exhaust gases flowing out of the combustor and drives the compressor and corresponding output shaft 13A or 13B. Each right angle nose gearbox 14A and 14B is coupled between a corresponding output shaft 13A or 13B and a corresponding output shaft 16A or 16B (collectively, "output shafts 16"). Each right angle nose gearbox 14A and 14B receives torque from the corresponding output shaft 13A or 13B and transfers the torque to the corresponding output shaft 16A or 16B. Output shafts 16A and 16B are coupled to and transfer torque to corresponding inputs of main reduction gearbox 18 (e.g., oriented at 180° from each other).

Main reduction gearbox 18 receives torque from output shafts 16 and outputs torque via first output shaft 20 and second output shaft 22. First output shaft 20 may be or may be coupled to a main propeller shaft, which may rotationally drive one or multiple main propellers (e.g., of a helicopter). Second output shaft 22 is coupled to clutch assembly 24. An output shaft 26 of clutch assembly 24 is a second propeller shaft, which may be a pusher prop shaft. A propeller 28 is coupled to output shaft 26 of clutch assembly 24.

In accordance with examples of the disclosure, clutch assembly 24 is configured to controllably transfer torque from second output shaft 22 to output shaft 26. Within clutch assembly 24, a first clutch element is coupled to second output shaft 22 and a second clutch element is coupled to output shaft 26. The first and second clutch elements are configured to mate when engaged to transfer torque from second output shaft 22 to output shaft 26 and to disengage to cease transferring torque from second output shaft 22 to output shaft 26. The first and second clutch elements may include complementary cone clutch elements, disc (or plate) clutch elements, or the like.

The first clutch element includes a first clutch element friction surface. The second clutch element includes a first friction surface configured to engage the first clutch element friction surface and a second friction surface opposite the first friction surface. The second clutch element is configured to move relative to the first clutch element to engage and disengage the first friction surface and the first clutch element friction surface. While engaged, the clutch elements enable transfer of torque from rotating second output shaft 22 to output shaft 26.

Clutch assembly 24 also includes a brake clutch coupled to a stationary component, such as a casing or housing of clutch assembly 24. The brake clutch comprises a brake clutch friction surface configured to engage the second friction surface of the second clutch element when the first clutch element and the second clutch element are disengaged. Engagement of the second clutch element and the brake clutch stops rotation of output shaft 26 and propeller 28. In this way, the brake may be implemented with relatively small additional volume within clutch assembly 24, while reducing or substantially eliminating windmilling of propeller 28. This may increase certainty around loading of bearings of output shaft 26, reduce or eliminate lubrication of the bearings of output shaft 26 while the brake is engaged, reduce or eliminate safety issues caused by propeller 28 windmilling while the helicopter is on the ground, and/or increase certainty in rotational speed of the second clutch element when engaging the second clutch element with the first clutch element.

Figure 2:
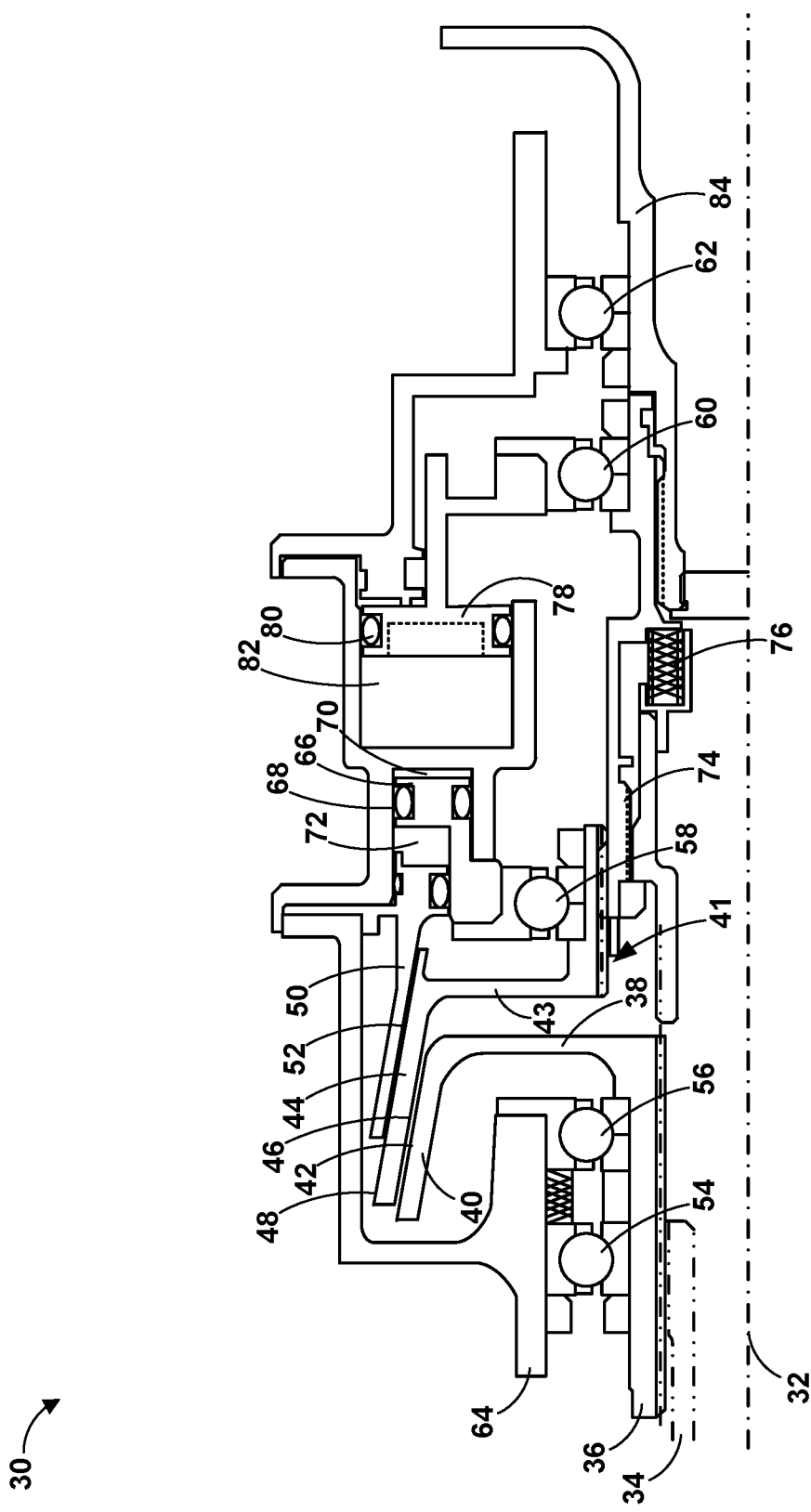
FIG. 2 is a schematic and conceptual diagram illustrating an example clutch assembly for a propulsion system for a helicopter or other rotary wing aircraft.

FIG. 2 is a schematic and conceptual diagram illustrating additional detail of an example clutch assembly 30 for a propulsion system for a helicopter or other rotary wing aircraft. Clutch assembly 30 of FIG. 2 is an example of clutch assembly 24 of FIG. 1. The diagram in FIG. 2 is a cross-sectional diagram illustrating the upper half of clutch assembly 30. As will be understood, clutch assembly 30 is substantially symmetrical about longitudinal axis 32. The rotating input and output shafts rotate about longitudinal axis 32, as do the other rotating components of clutch assembly 30. Hence, at least the rotating components of clutch assembly 30 are symmetrical about longitudinal axis 32.

Clutch assembly 30 includes a housing 64, which may include one or more pieces that together separate the inner volume of clutch assembly 30 from the external environment. Housing 64 may be fixed or attached to a non-rotating part of the airframe (e.g., helicopter) in which clutch assembly 30 is used.

Clutch assembly 30 includes input shaft 34, which may correspond to second output shaft 22 of FIG. 1. Input shaft 34 is coupled to (e.g., mechanically connected to) a first clutch element 36. First clutch element 36 includes a flange 38 extending radially outward relative to input shaft 34 and a cone structure 40. In other examples, first clutch element may include any other suitable clutch element, such as a plate or disc, or the like. Cone structure 40 extends axially forward and radially outward from flange 38 relative to longitudinal axis 32. Cone structure 40 defines a first clutch element friction surface 42, which is configured to engage a complementary surface of a second clutch element 41 coupled to output shaft 84. As shown in FIG. 2, first clutch element friction surface 42 is on a radially outward face of cone clutch element 40.

Input shaft 34 and first clutch element 36 are supported and allowed to rotate relative to housing 64 by at least one bearing. In the example of FIG. 2, the at least one bearing includes a first bearing 54 and a second bearing 56. While input shaft 34 is rotating, first bearing 54 and second bearing 56 may be lubricated using lubricant (e.g., oil) that is supplied by a lubrication system that also supplies lubricant to main reduction gearbox 18.

Clutch assembly 30 also includes an output shaft 84, which is coupled to a second clutch element 41. Second clutch element 41 includes a flange 43 extending radially outward relative to output shaft 84 and a cone structure 44. In other examples, second clutch element 41 may include any other suitable clutch element, such as a plate or disc, or the like. Cone structure 44 extends axially forward and radially outward from flange 43 relative to longitudinal axis 32. Cone structure 44 defines a first friction surface 46, which is configured to engage first clutch element friction surface 42. Cone structure 44 also includes a second friction surface 48 opposite first friction surface 46. As shown in FIG. 2, first friction surface 46 is on a radially inward face of cone clutch element 44, and second friction surface 48 is on a radially outward face of cone clutch element 44.

In accordance with examples of the disclosure, clutch assembly 30 also includes a brake clutch 50 coupled to a stationary component, such as housing 64. Brake clutch 50 includes a brake clutch friction surface 52 configured to engage second friction surface 48 of second clutch element 41 when first clutch element 36 and second clutch element 41 are disengaged. Engagement of second clutch element 41 and brake clutch 50 stops rotation of output shaft 84 and propeller 28 (FIG. 1).

Figure 3:
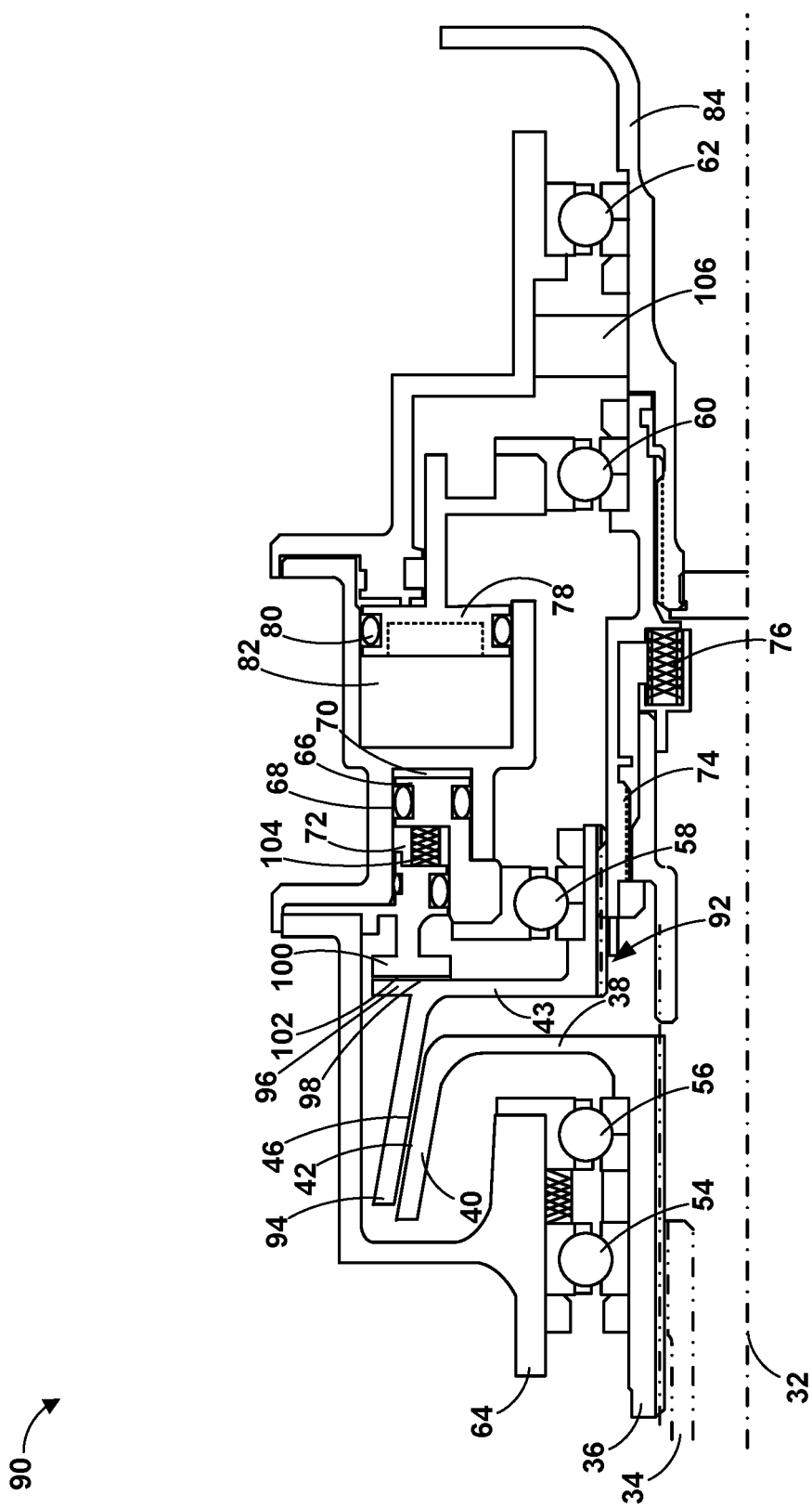
FIG. 3 is a schematic and conceptual diagram illustrating another example clutch assembly for a propulsion system for a helicopter or other rotary wing aircraft.

In the example shown in FIG. 2, brake clutch 50 includes a cone clutch. Brake clutch 50 extends axially forward and radially outward with respect to longitudinal axis 32. In other examples, such as shown in FIG. 3, brake clutch 50 may include a plate or disc clutch. Brake clutch friction surface 52 is on a radially inward face of brake clutch 50 and has a complementary shape to second friction surface 48 of second clutch element 41. By including a cone clutch, relatively low axial forces (parallel to longitudinal axis 32) on second clutch element 41 may translate to relatively large friction forces between brake clutch friction surface 52 and second friction surface 48 of second clutch element 41. Further, brake clutch 50 may fit within available space between housing 64 and second clutch element 41.

Second clutch element 41 (and output shaft 84) may be supported and allowed to rotate relative to housing 64 by a third bearing 58. Further, second clutch element 41 may be connected to a clamp piston 66 that moves axially within housing 64, e.g., under pneumatic or hydraulic pressure. For example, to move second clutch element 41 axially forward to engage first friction surface 46 with first clutch element friction surface 42, oil or another fluid may be introduced into cavity 70 between clamp piston 66 and housing 64. Concurrently, oil or another fluid may be removed from cavity 72. To move second clutch element 41 axially rearward to engage second friction surface 48 with brake clutch friction surface 52, oil or another fluid may be removed from cavity 70 between clamp piston 66 and housing 64 and introduced into cavity 72. Clutch assembly 30 may include a seal 68 (e.g., an o-ring) to prevent the oil or fluid from flowing from cavity 70 to cavity 72 or vice versa.

Clutch assembly 30 also includes fourth and fifth bearings 60 and 62, which support output shaft 84 and allow output shaft 84 to rotate relative to housing 64.

In some examples, clutch assembly 30 optionally includes a lock shaft assembly 74, which engages with input shaft 34 upon second clutch element 41 engaging first clutch element 36 and reaching synchronous speeds. Lock shaft assembly 74 may be coupled to output shaft 84 such that lock shaft assembly 74 rotates (or does not rotate) synchronously with output shaft 84 at all times (e.g., both when engaged with and disengaged from input shaft 34). Alternatively, lock shaft assembly 74 may engage and disengage output shaft 84 when engaging and disengaging with input shaft 34, such that lock shaft assembly 74 rotates synchronously with input shaft 34 and output shaft 84 when engaged and does not rotate synchronously with either input shaft 34 or output shaft 84 when disengaged.

Lock shaft assembly 74 includes a lock piston 78 that engages with housing 64 to define a cavity 82 and a spring 76, which biases lock shaft assembly 74 into an engaged (locked) state. Lock piston 78 may be moved to disengage lock shaft assembly 74 with input shaft 34 by filling cavity 82 with a fluid, such as transmission oil. A seal 80 (such as an o-ring) may be positioned around lock piston 78 to seal with housing 64. Upon removing fluid from cavity 82, the force from spring 76 moves lock shaft assembly 74 into engagement with input shaft 34 (and, in some examples, output shaft 84). When engaged, lock shaft assembly 74 provides additional mechanical connection between input shaft 34 and output shaft 84, e.g., in implementations in which engagement between first clutch element friction surface 42 and first friction surface 46 of second clutch element 41 is insufficient to transfer all torque from input shaft 34 to output shaft 84 without slipping.

In this way, clutch assembly 30 may include a clutch brake 50 that may be implemented with relatively small additional volume within clutch assembly 24, while reducing or substantially eliminating windmilling of propeller 28. This may increase certainty around loading of bearings of output shaft 26, reduce or eliminate lubrication of the bearings of output shaft 26 while the brake is engaged, reduce or eliminate safety issues caused by propeller 28 windmilling while the helicopter is on the ground, and/or increase certainty in rotational speed of the second clutch element when engaging the second clutch element with the first clutch element.

In some examples, rather than the clutch brake including a cone structure, the clutch brake may include an annular disc structure. For example, FIG. 3 is a schematic and conceptual diagram illustrating another example clutch assembly 90 for a propulsion system for a helicopter or other rotary wing aircraft. Clutch assembly 90 of FIG. 3 may be substantially similar to clutch assembly 30 of FIG. 2, aside from the differences described herein.

For example, instead of a second clutch element 41 including a cone structure having friction surface on inner and outer faces of the cone, as in clutch assembly 30, clutch assembly 90 includes a second clutch element 92 that includes a cone structure 94 and an annular disc 96 extending from flange 43 and coupled to a back end of cone structure 94. Second clutch annular structure 96 includes a second friction surface 98. Second friction surface 98 is generally opposite first friction surface 46.

Clutch assembly 90 also includes a brake clutch 100 that includes a second annular disc defining an annular brake friction surface 102. The second annular disc and annular brake friction surface 102 are shaped and positioned so that annular brake friction surface 102 engages with second friction surface 98 of second clutch element 92 when second clutch element 92 is disengaged from first clutch element 36.

Clutch assembly 90 also optionally includes a biasing member 104, such as a spring, which biases second clutch element 92 into engagement with brake clutch 100. Biasing member 104 may be positioned in cavity 72. Biasing member 104 may have a biasing force that is selected to maintain second friction surface 98 in engagement with annular brake friction surface 102 in the absence of sufficient force applied by fluid in cavity 70. In this way, biasing member 104 may cause clutch assembly 90 to fail into a braked position.

Additionally, or alternatively, clutch assembly 90 may optionally include a sprag clutch 106. Sprag clutch 106 may be configured to allow rotation of output shaft 84 in only a single direction, e.g., a forward direction. This may substantially prevent windmilling in a reverse direction, e.g., while second clutch element 92 is being moved from engagement with brake clutch 100 to engagement with first clutch element 36. This may reduce variability in rotational speed of second clutch element when moving from engagement with brake clutch 100 to engagement with first clutch element 36, which may reduce or make more predictable engagement forces between first clutch element 36 and second clutch element 92.

Figure 4:
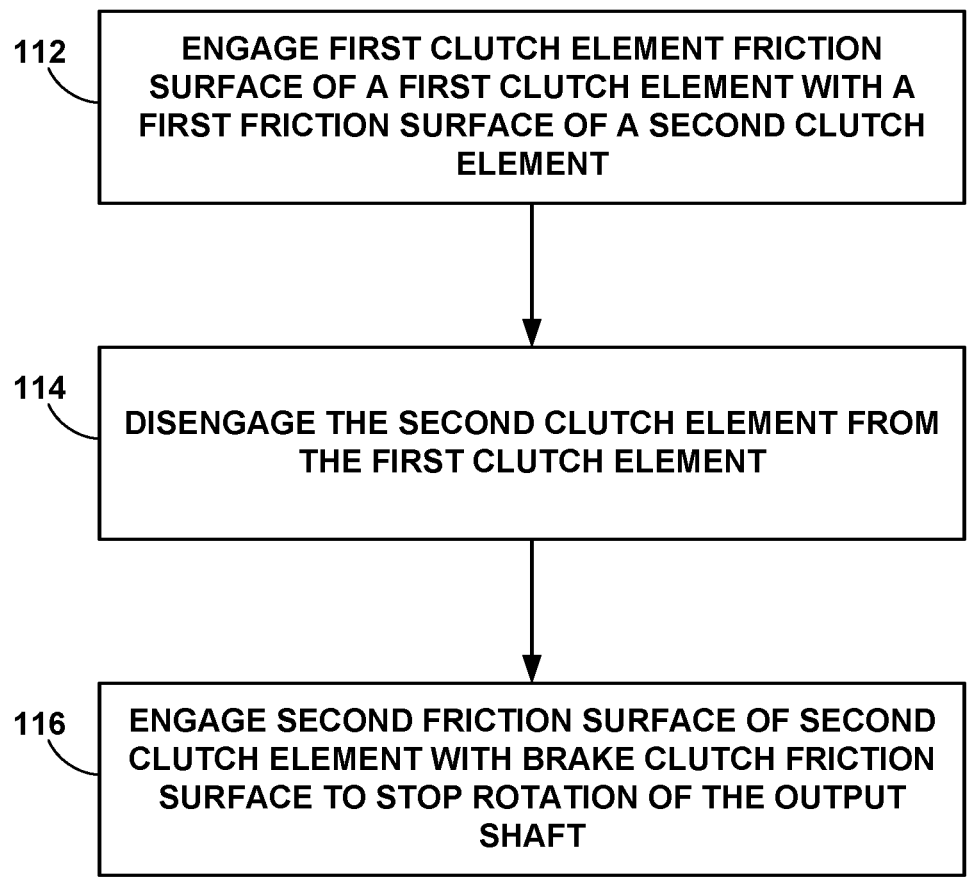
FIG. 4 is a flow diagram of an example technique of operating a clutch assembly including a brake clutch.

FIG. 4 is a flow diagram of an example technique of operating a clutch assembly including a brake clutch. The technique of FIG. 4 will be described with reference to clutch assembly 30 of FIG. 2 for ease of description. However, it will be understood that the technique of FIG. 4 may be implemented using other clutch assemblies, such as clutch assembly 90 of FIG. 3. The technique of FIG. 4 includes engaging a first clutch element friction surface 42 of a first clutch element 36 coupled to an input shaft 34 with a first friction surface 46 of a second clutch element 41 coupled to an output shaft 84 to transfer torque from input shaft 34 to output shaft 84. Second clutch element 41 further includes a second friction surface 48 opposite first friction surface 46. Second clutch element 41 is configured to move relative to first clutch element 36 to engage and disengage first friction surface 46 and first clutch element friction surface 42 (112).

The technique of FIG. 4 also includes disengaging second clutch element 41 from first clutch element 36 to stop transfer of torque from input shaft 34 to output shaft 84 (114).

The technique of FIG. 4 further includes engaging second friction surface 48 of second clutch element 41 with brake clutch friction surface 52 of a brake clutch 50 coupled to a stationary component to stop rotation of output shaft 84 (116). As described above, this may stop rotation of output shaft 84 and any propeller coupled to output shaft 84.

In some examples, the technique of FIG. 4 may optionally include engaging a lock shaft of a lock shaft assembly 74 to input shaft 34 while first clutch element 36 and second clutch element 41 are engaged. As described above, this may increase mechanical connection between input shaft 34 and output shaft 84 to enable torque transfer from input shaft 34 to output shaft 84.

Clause 1: A clutch assembly comprising: a first clutch element coupled to an input shaft and comprising a first clutch element friction surface; a second clutch element coupled to an output shaft, wherein the second clutch element comprises a first friction surface configured to engage the first clutch element friction surface and a second friction surface opposite the first friction surface, wherein the second clutch element is configured to move relative to the first clutch element to engage and disengage the first friction surface and the first clutch element friction surface; and a brake clutch coupled to a stationary component, wherein the brake clutch comprises a brake clutch friction surface configured to engage the second friction surface of the second clutch element when the first clutch element and the second clutch element are disengaged.

Clause 2: The clutch assembly of clause 1, wherein the first clutch element comprises a first cone clutch and the second clutch element comprises a second cone clutch.

Clause 3: The clutch assembly of clause 2, wherein the second friction surface comprises a back cone-shape surface of the second cone clutch, wherein the brake clutch comprises a cone brake clutch, and wherein the brake clutch friction surface comprises an inner surface of the cone brake clutch.

Clause 4: The clutch assembly of clause 2, wherein the second friction surface comprises a first annular disc coupled to a back end of the second cone clutch, and wherein the brake clutch comprises a second annular disc coupled to the stationary component.

Clause 5: The clutch assembly of any one of clauses 1 to 4, further comprising a lock shaft assembly configured to engage a lock shaft to the input shaft when the first clutch element and the second clutch element are engaged.

Clause 6: The clutch assembly of any one of clauses 1 to 5, further comprising a sprag clutch coupled to the output shaft and located on the opposite side of the second clutch element from the first clutch element.

Clause 7: A system comprising: a gearbox; a propeller coupled to a propeller shaft; and a clutch assembly comprising: a first clutch element coupled to an input shaft and comprising a first clutch element friction surface, wherein the input shaft is coupled to the gearbox; a second clutch element coupled to the propeller shaft, wherein the second clutch element comprises a first friction surface configured to engage the first clutch element friction surface and a second friction surface opposite the first friction surface, wherein the second clutch element is configured to move relative to the first clutch element to engage and disengage the first friction surface and the first clutch element friction surface; and a brake clutch coupled to a stationary component, wherein the brake clutch comprises a brake clutch friction surface configured to engage the second friction surface of the second clutch element when the first clutch element and the second clutch element are disengaged, and wherein engagement of the second clutch element and the brake clutch stops rotation of the propeller.

Clause 8: The system of clause 7, wherein the first clutch element comprises a first cone clutch and the second clutch element comprises a second cone clutch.

Clause 9: The system of clause 8, wherein the second friction surface comprises a back cone-shape surface of the second cone clutch, wherein the brake clutch comprises a cone brake clutch, and wherein the brake clutch friction surface comprises an inner surface of the cone brake clutch.

Clause 10: The system of clause 8, wherein the second friction surface comprises a first annular disc coupled to a back end of the second cone clutch, and wherein the brake clutch comprises a second annular disc coupled to the stationary component.

Clause 11: The system of any one of clauses 7 to 10, further comprising a lock shaft assembly configured to engage a lock shaft to the input shaft when the first clutch element and the second clutch element are engaged.

Clause 12: The system of any one of clauses 7 to 11, wherein the propeller comprises a pusher prop of a pusher prop helicopter.

Clause 13: The system of any one of clauses 7 to 12, further comprising at least one gas turbine engine coupled to the gearbox.

Clause 14: The system of any one of clauses 7 to 13, wherein the clutch assembly further comprises a sprag clutch coupled to the propeller shaft and located on the opposite side of the second clutch element from the first clutch element.

Clause 15: A method comprising: engaging a first clutch element friction surface of a first clutch element coupled to an input shaft with a first friction surface of a second clutch element coupled to an output shaft to transfer torque from the input shaft to the output shaft, wherein the second clutch element further comprises a second friction surface opposite the first friction surface, wherein the second clutch element is configured to move relative to the first clutch element to engage and disengage the first friction surface and the first clutch element friction surface; disengaging the second clutch element from the first clutch element to stop transfer to torque from the input shaft to the output shaft; and engaging the second friction surface of the second clutch element with brake clutch friction surface of a brake clutch coupled to a stationary component to stop rotation of the output shaft.

Clause 16: The method of clause 15, wherein the first clutch element comprises a first cone clutch and the second clutch element comprises a second cone clutch.

Clause 17: The method of clause 16, wherein the second friction surface comprises a back cone-shape surface of the second cone clutch, wherein the brake clutch comprises a cone brake clutch, and wherein the brake clutch friction surface comprises an inner surface of the cone brake clutch.

Clause 18: The method of clause 16, wherein the second friction surface comprises a first annular disc coupled to a back end of the second cone clutch, and wherein the brake clutch comprises a second annular disc coupled to the stationary component.

Clause 19: The method of any one of clauses 15 to 18, further comprising engaging a lock shaft of a lock shaft assembly to the input shaft while the first clutch element and the second clutch element are engaged.

Clause 20: The method of any one of clauses 15 to 19, further comprising a pusher prop coupled to the output shaft.

Various examples have been described. These and other examples are within the scope of the following claims.

What is claimed is:

1. An assembly comprising:
   a first clutch element coupled to an input shaft and comprising a first clutch element friction surface;
   a second clutch element coupled to an output shaft, wherein the second clutch element comprises a first friction surface configured to engage the first clutch element friction surface and a second friction surface opposite the first friction surface, wherein the second clutch element is configured to move relative to the first clutch element to engage and disengage the first friction surface and the first clutch element friction surface; and
   a brake clutch coupled to a stationary component, wherein the brake clutch comprises a brake clutch friction surface configured to engage the second friction surface of the second clutch element when the first clutch element and the second clutch element are disengaged,
   wherein the first clutch element comprises a first cone structure and the second clutch element comprises a second cone structure, and
   wherein the second friction surface comprises a first annular disc coupled to a back end of the second cone clutch, and wherein the brake clutch comprises a second annular disc coupled to the stationary component.

2. The assembly of claim 1, further comprising a lock shaft assembly configured to provide an additional mechanical connection between the output shaft and the input shaft when the first clutch element and the second clutch element are engaged and rotating synchronously.

3. The assembly of claim 1, further comprising a sprag clutch coupled to the output shaft and located on the opposite side of the second clutch element from the first clutch element.

4. The assembly of claim 1, wherein the output shaft comprises a propeller shaft, the assembly further comprising:
   a gearbox; and
   a propeller coupled to the propeller shaft,
      wherein the input shaft is coupled to the gearbox, wherein the
      second clutch element is coupled to the propeller shaft, and wherein engagement of the second clutch element and the brake clutch stops rotation of the propeller.

5. The assembly of claim 4, wherein the propeller comprises a pusher prop of a pusher prop helicopter.

6. The assembly of claim 4, further comprising at least one gas turbine engine coupled to the gearbox.

7. The assembly of claim 4, further comprising a sprag clutch coupled to the propeller shaft and located on the opposite side of the second clutch element from the first clutch element.

8. A method comprising:
   engaging a first clutch element friction surface of a first clutch element coupled to an input shaft with a first friction surface of a second clutch element coupled to an output shaft to transfer torque from the input shaft to the output shaft, wherein the second clutch element further comprises a second friction surface opposite the first friction surface, wherein the second clutch element is configured to move relative to the first clutch element to engage and disengage the first friction surface and the first clutch element friction surface;
   disengaging the second clutch element from the first clutch element to stop transfer of torque from the input shaft to the output shaft; and
   engaging the second friction surface of the second clutch element with brake clutch friction surface of a brake clutch coupled to a stationary component to stop rotation of the output shaft; and
   wherein the first clutch element comprises a first cone clutch and the second clutch element comprises a second cone clutch,
   wherein the second friction surface comprises a first annular disc coupled to a back end of the second cone clutch, and wherein the brake clutch comprises a second annular disc coupled to the stationary component.

9. The method of claim 8, further comprising engaging a lock shaft assembly to provide an additional mechanical connection between the output shaft and the input shaft while the first clutch element and the second clutch element are engaged and rotating synchronously.

10. The method of claim 8, further comprising a pusher prop coupled to the output shaft.

11. An assembly comprising:
    a first clutch element coupled to an input shaft and comprising a first clutch element friction surface;
    a second clutch element coupled to an output shaft, wherein the second clutch element comprises a first friction surface configured to engage the first clutch element friction surface and a second friction surface opposite the first friction surface, wherein the second clutch element is configured to move relative to the first clutch element to engage and disengage the first friction surface and the first clutch element friction surface;
    a brake clutch coupled to a stationary component, wherein the brake clutch comprises a brake clutch friction surface configured to engage the second friction surface of the second clutch element when the first clutch element and the second clutch element are disengaged; and
    a lock shaft assembly configured to provide an additional mechanical connection between the output shaft and the input shaft when the first clutch element and the second clutch element are engaged and rotating synchronously.

12. The assembly of claim 11, wherein the first clutch element comprises a first cone structure and the second clutch element comprises a second cone structure.

13. The assembly of claim 12, wherein the second friction surface comprises a radially outer surface of the second cone structure, wherein the brake clutch comprises a cone brake clutch, and wherein the brake clutch friction surface comprises a radially inner surface of the cone brake clutch.

14. The assembly of claim 12, wherein the second friction surface comprises a first annular disc coupled to a back end of the second cone clutch, and wherein the brake clutch comprises a second annular disc coupled to the stationary component.

15. The assembly of claim 11, further comprising a sprag clutch coupled to the output shaft and located on the opposite side of the second clutch element from the first clutch element.

16. The assembly of claim 11, wherein the output shaft comprises a propeller shaft, the assembly further comprising:
    a gearbox;

a propeller coupled to the propeller shaft, wherein the input shaft is coupled to the gearbox, wherein the second clutch element is coupled to the propeller shaft, and wherein engagement of the second clutch element and the brake clutch stops rotation of the propeller.

17. The assembly of claim 16, wherein the propeller comprises a pusher prop of a pusher prop helicopter.

18. The assembly of claim 16, further comprising at least one gas turbine engine coupled to the gearbox.

19. The assembly of claim 16, further comprising a sprag clutch coupled to the propeller shaft and located on the opposite side of the second clutch element from the first clutch element.

* * * * *